(No Model.) 2 Sheets—Sheet 1.

T. PUETZ, Jr.
PLUG TOBACCO MACHINE.

No. 336,527. Patented Feb. 16, 1886.

Attest:
Walter Allen
F. A. Hopkins

Inventor:
Tillman Puetz Jr
By Knight Bros
attys.

N. PETERS, Photo-Lithographer, Washington, D. C.

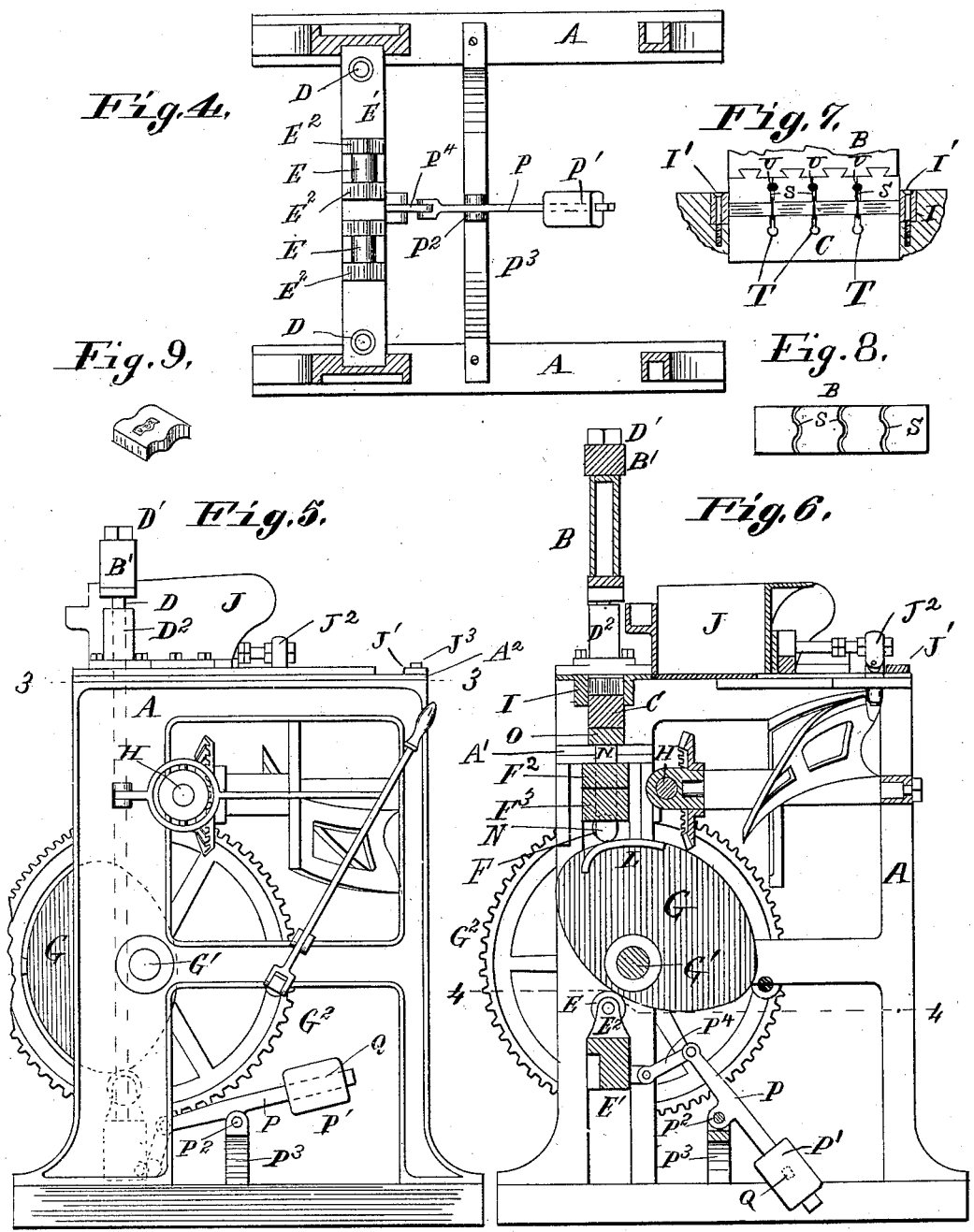

UNITED STATES PATENT OFFICE.

TILLMAN PUETZ, JR., OF ST. LOUIS, MISSOURI.

PLUG-TOBACCO MACHINE.

SPECIFICATION forming part of Letters Patent No. 336,527, dated February 16, 1886.

Application filed October 13, 1885. Serial No. 179,748. (No model.)

*To all whom it may concern:*

Be it known that I, TILLMAN PUETZ, Jr., of the city of St. Louis, in the State of Missouri, have invented certain new and useful Improvements in Plug-Tobacco Machines, of which the following is a full, clear, and exact description, reference being had to the accompanying drawings, forming part of this specification, in which—

Figure 1:
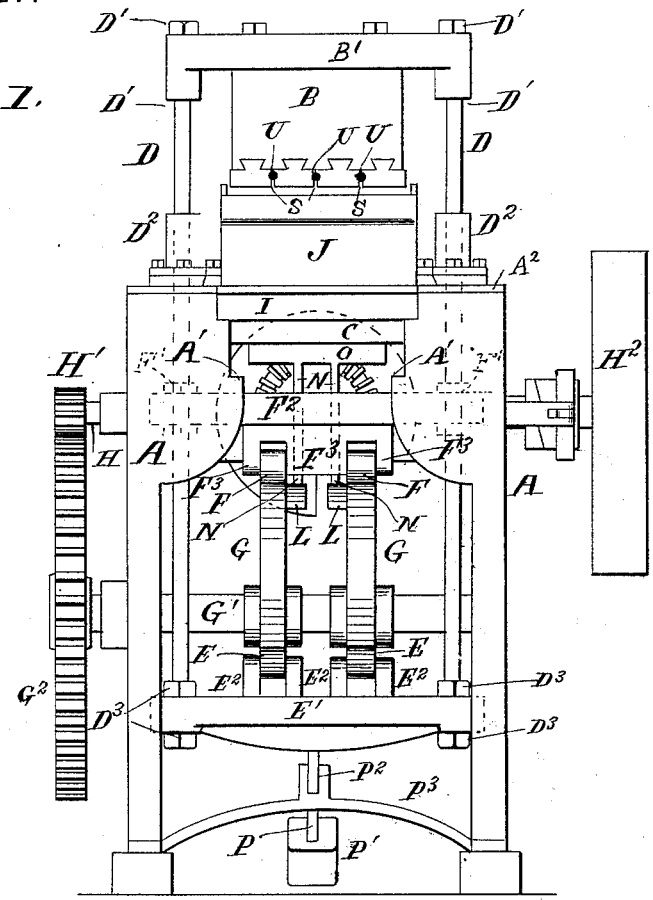
Figures 2, 3:
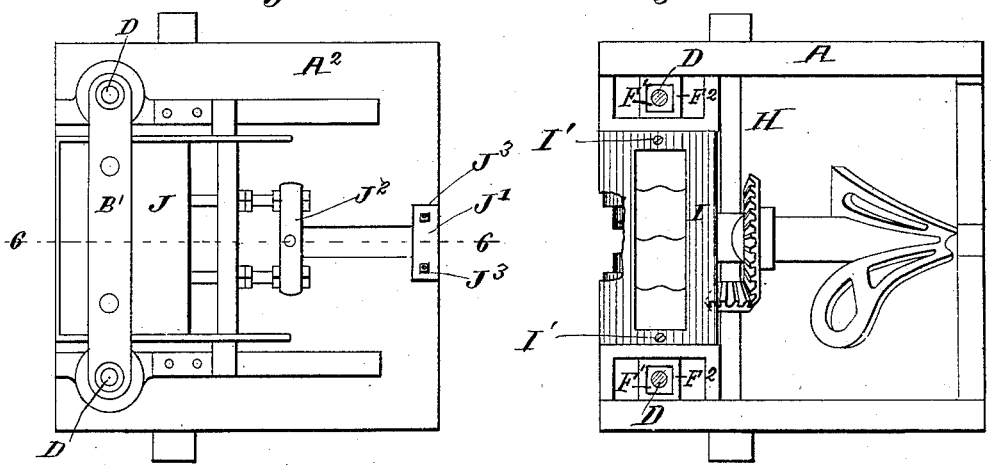

Figure 1 is a front view of my improved machine. Fig. 2 is a top view. Fig. 3 is a horizontal section taken on line 3 3, Fig. 5. Fig. 4 is a horizontal section taken on line 4 4, Fig. 6. Fig. 5 is a side elevation. Fig. 6 is a vertical section taken on line 6 6, Fig. 2. Fig. 7 is a detail view showing the knives or cutters and part of the mold. Fig. 8 is a face or bottom view of the upper plunger. Fig. 9 represents a piece of tobacco which my machine is capable of pressing and cutting.

My invention relates to certain improvements in machines for making tobacco plugs, for which Letters Patent Nos. 330,849 and 330,850 were granted on the 17th of November, 1885; and my invention consists in features of novelty hereinafter fully described, and pointed out in the claims.

Referring to the drawings, A represents the frame of the machine, having a table, $A^2$. B represents the upper plunger, secured to the upper cross-head, B', and C the lower plunger. Rods D are connected to the upper cross-head by nuts or collars D'. From the upper cross-head the rods extend downwardly through guide-tubes $D^2$, secured to the frame of the machine through the table. Secured to the lower ends of the rods by nuts or collars $D^3$ is the lower cross-head, E', to which are journaled friction-rollers E, between projections $E^2$ on the lower cross-head. (See Fig. 1.) Secured to the rods between the table and lower cross-head, E', by nuts or collars F', is a cross-beam, $F^2$, provided with friction-rollers F, journaled between projections $F^3$ depending from the beam. Between these two sets of rollers E and F are two operating-cams, G, on a shaft, G', journaled in boxes secured to the frame of the machine. On one end of this shaft is a cog-wheel, $G^2$, into which meshes a pinion, H', on the main driving-shaft H, journaled in boxes secured to the frame of the machine, and provided with a driving-pulley, $H^2$.

I represents the mold of the machine, fitted in the frame, as shown in Fig. 1, and held in place by screws l', as shown in Figs. 3 and 7. The bottom of the mold is formed by the lower plunger when in its lower or normal position, where it is held from downward movement by fitting against projections A' of the frame of the machine. The lower plunger is shown raised off these projections in Fig. 1, to extract the plug or plugs, and in its lower or normal position in Fig. 6.

J represents the charger of the machine, which is similar to that shown and described in said Letters Patent No. 330,850, and needs no description *per se* here, as I do not claim it in this application. Its backward movement is limited by a stop-plate, J', or other suitable means, against which its cross-head $J^2$ strikes when the charger has completed its backward movement. The plate is secured to the table of the machine by bolts $J^3$, and by removing the nuts from these bolts the plate can be taken off, and the charger can then be slid back off the table of the machine, to permit it and the table to be cleaned of dirt and matter formed by the licorice in the tobacco, or to permit another charger of less or greater width, if desired, to be substituted for it. When the charger has been filled and the machine set in motion, the charger is first advanced, as described in said application, and the upper plunger is then lowered by the cams G, bearing upon the friction-rollers E, (the lower cross-head, E', beam $F^2$, upper cross-head, B', carrying the upper plunger, and connecting-rods D' being moved downward bodily together.) This movement causes the tobacco to be forced from the charger into the mold and to be compressed in the mold between the moving upper plunger and the lower plunger, while the latter is seated on its supports. When the plug is pressed, the upper plunger is raised or lifted out of the mold by the cams G, coming against the friction-rollers F, secured to the beam $F^2$, (the beam $F^2$, cross-heads B' and E', and rods F' being moved upward, of course, with the upper plunger,) the charger then recedes, as described in said Letters Patent No. 330,850, and the plug is then ejected by the upward movement of the lower plunger, which is effected by means of small auxiliary cams L, projecting laterally, one from each main cam G, these cams coming against the lower ends of vertical plates N, extending down through the cross-beam F², and having on their upper ends a connecting head or bar, O, which fits against the under side of the lower plunger. The lower plunger is thus raised to lift the plug out of the mold, as shown in Fig. 6. As soon as the cams L pass the ends of the plates N, the plates and lower plunger fall to their lower position.

To prevent the upper plunger and its connections from falling too rapidly the first part of their downward movement, (which takes place when the salient parts of the cams G leave the rollers F,) I secure a counterbalance-weight, P', to the outer end of a bar, P, pivoted at P² to a suitable support, P³, (see Fig. 6,) and connected at its inner end by means of a link, P⁴, to the cross-head E'. This counterbalance may be adjusted on the bar and held to its adjustment by a set-screw, Q, and its weight is a little less than the weight of the upper plunger, cross-beam F², cross-heads B' and E', and rods D, and acts to let them down gently and prevent jarring that exists in its absence.

It has been found in practice that in making plugs of tobacco with this class of machines it frequently occurs that there is a little more tobacco in one end of the charger, and consequently in one end of the mold, than in the other. This is largely, if not entirely, due to the sticky nature of the material, (licorice being mixed with the tobacco,) which prevents it from adjusting itself in the mold as the plunger descends, as clay would do in a brick-machine, for instance, and the effect is, with a single compressing-cam G, to cause the plunger to bind or tend to bind in the mold by one end or side having greater resistance than the other. By the use of two cams G this difficulty is wholly and effectually avoided, and the machine in other ways acts more smoothly and satisfactorily.

It is sometimes desired, especially with certain manufacturers, to have plugs cut up into small pieces by irregular or wavy cuts, as shown in Fig. 9, and to accomplish this it has sometimes been the practice heretofore to take a plug as it comes from a pressing-machine to a machine that cuts it up. I dispense with the use of this second machine and the labor, expense, and time connected with its use by placing wavy or irregular-formed knives R in the molds of my machine, (see Figs. 3 and 7,) which separate the plug into small pieces by wavy or irregular cuts while the pressing is being done, the upper plunger forcing the tobacco down upon the cutters, and having recesses S to receive the upper edges of the cutters when it (the plunger) has reached its lower position. The lower plunger has like recesses, T, which the cutters enter as the plunger moves upward to eject the plug. By this means I am able to produce the plugs cut up in this shape ready for wrapping, avoiding the necessity of another machine, the labor required to handle the plugs or pieces, and the expense of the labor and machine. These irregular cutters call for irregular recesses S and T in the plungers. With the lower plunger these recesses need not be made with much care to accurately fit the cutters, as their only object is to permit the plunger to rise and eject the plug; but with the upper plunger it is different, for the cutters must fit in them snugly in order to sever the fibers of tobacco with ease. The lower plunger, therefore, can be cast all in one piece, and the recesses be produced by means of a core, while in order to get the desired accuracy in the shape and size of the recess of the upper plunger it is necessary to cast the face of the plunger in sections and dovetail or otherwise secure the sections to the body of the plunger. They are shown dovetailed in the body in Figs. 1 and 7. The recesses form the divisions between the sections. The upper parts of these recesses in the upper plunger are made larger than the lower parts, as shown, to receive and hold rubber or other elastic pieces or strips, U, against which the cutters press to sever the threads or fibers of the tobacco.

I claim as my invention—

1. The combination of the upper cross-head, B', plunger B, secured thereto, lower cross-head, E', having paired projections E², provided with friction-rollers E, cross-beam F², having projections F³, provided with a pair of friction-rollers, F, vertical sliding rods D, to which the cross-beam and cross-heads are secured, shaft G, having cams G', provided with auxiliary cams L on their inner sides, lower plunger, C, lower plunger-head, O, having plates N, on which the auxiliary cams bear to elevate the lower plunger, a support, P³, bar P, pivot P², hinging the bar to the support, link P⁴, connecting the inner end of the bar to the lower cross-head, and means for pressing down the outer end of the bar, the bar being arranged to oscillate from a horizontal to a vertical position, substantially as set forth.

2. The combination, with the mold having cutters, of the compressing-plunger having recesses in its face, and elastic strips located in the recesses for enabling the cutters to sever the threads or fibers of the material being operated upon, substantially as set forth.

3. The combination, with a mold having cutters, of the lower plunger having recesses in its face and forming the bottom of the mold and discharger, and the compressing-plunger having recesses in its face and elastic strips located in its recesses and bearing on the cutters, substantially as set forth.

TILLMAN PUETZ, JR.

Witnesses:
OCTAVIUS KNIGHT,
GEO. H. KNIGHT.